(12) United States Patent
Lee et al.

(10) Patent No.: US 6,867,806 B1
(45) Date of Patent: Mar. 15, 2005

(54) INTERLACE OVERLAP PIXEL DESIGN FOR HIGH SENSITIVITY CMOS IMAGE SENSORS

(75) Inventors: Sywe N. Lee, Taipei Hsien (TW); David Wayne, Scottsdale, AZ (US)

(73) Assignee: Taiwan Advanced Sensors Corporation, Taipei Hsien (TW)

( * ) Notice: Subject to any disclaimer, the term of this patent is extended or adjusted under 35 U.S.C. 154(b) by 0 days.

(21) Appl. No.: 09/433,677

(22) Filed: Nov. 4, 1999

(51) Int. Cl.$^7$ .......................... H04N 3/14; H04N 5/335
(52) U.S. Cl. ...................... 348/308; 348/302
(58) Field of Search ................ 348/308, 302, 348/301, 317, 249; 250/339.02, 208.1; 257/440, 191, 292

(56) References Cited

U.S. PATENT DOCUMENTS

| | | | | |
|---|---|---|---|---|
| 5,272,535 A | * | 12/1993 | Elabd | 348/317 |
| 5,274,459 A | * | 12/1993 | Hamasaki | 348/249 |
| 5,523,570 A | * | 6/1996 | Hairston | 250/339.02 |
| 5,751,005 A | * | 5/1998 | Wyles et al. | 257/440 |
| 5,900,623 A | | 5/1999 | Tsang et al. | 250/208.1 |
| 5,955,753 A | * | 9/1999 | Takahashi | 257/292 |
| 6,069,365 A | * | 5/2000 | Chow et al. | 250/208.1 |
| 6,091,449 A | * | 7/2000 | Matsunaga et al. | 348/308 |
| 6,233,013 B1 | * | 5/2001 | Hosier et al. | 348/308 |
| 6,465,860 B2 | * | 10/2002 | Shigenaka et al. | 257/440 |

OTHER PUBLICATIONS

U.S. Appl. No. 09/103,959, filed Jun. 24, 1998, Autocalibration of the A/D Converter Within CMOS Type Image Sensor, 20 pages of specification and 13 pages of drawings.

* cited by examiner

*Primary Examiner*—Aung Moe
(74) *Attorney, Agent, or Firm*—Fulbright & Jaworski LLP

(57) ABSTRACT

In a CMOS-type image sensor, a plurality of pairs of light-detecting elements (LDEs) are arranged in rows and columns to generate analog signals proportional to the intensity of light impinging on respective one of the LDEs. First and second photo sensing means in each pair of LDEs are coupled in parallel, in the column direction, at a floating sensing point through first turn-on means. The first and second photo sensing means in adjacent pairs of LDEs are coupled in parallel in the column direction through second turn-on means. The first turn-on means are enabled by first control lines and the second turn-on means are enabled by second control lines coupled thereto, respectively. Analog signals acquired in the first and second photo sensing means of one pair or of adjacent pairs are present at the floating sensing point in response to the enabling of the first or second control lines, respectively.

13 Claims, 8 Drawing Sheets

INTERLACE OVERLAP PIXEL DESIGN FOR HIGH SENSITIVITY CMOS IMAGE SENSORS

FIELD OF INVENTION

The present invention relates to a CMOS type image sensor and, in particular, to a special pixel structure to enhance the sensitivity and picture quality of the CMOS type image sensor.

BACKGROUND OF INVENTION

An image sensor is used to transform an optical image focused on the sensor into an electrical signal. The image sensor typically contains an array of light detecting elements, wherein each element produces an analog signal in response to the light intensity of an image impinging on the element when the image is focused on the array. These signals from the sensor array may then be used to display a corresponding image on a display.

One very well known type of the image sensor is the charge-coupled device (CCD). An integrated circuit chip containing CCD image sensors is expensive due to the specific process required. The CCD also requires relatively large power dissipation, because of the required clock signals and the high voltage that is usually needed. Compared with the CCD image sensor, a CMOS active pixel sensors (APS) has attracted much attention recently because of its capability of monolithic integration of the circuits of control, drive and signal processing into a single sensor chip. The advantages of the CMOS APS imager are: low voltage operation and low power consumption, process compatibility with on-chip electronics, and potentially lower cost, as compared with the conventional CCD. This is derived from the wide availability of a standard CMOS manufacturing process.

However, it has been well known that the CMOS image sensor suffers from noise issues which can adversely degrade the performance. These noises include kTC noise associated with the sampling of the image data; 1/f noise associated with the circuits used to amplify the image signal; and fixed pattern noise associated with non-uniformity, primarily between columns within the array. These noise issues significantly become major factors causing the CMOS active pixel sensor to have lower sensitivity or lower dynamic range compared to the CCD.

FIG. 1A illustrates the architecture of a conventional CMOS image sensor of 512 by 512 active pixels formed on a single integrated circuit chip. Some examples of the conventional CMOS image sensors can be seen in U.S. patent application Ser. No. 09/103,959 and U.S. Pat. No. 5,900,623. An image sensor core 19 comprises a two-dimensional pixel array of light detecting elements 10 which include identical circuitry shown in FIG. 1B. When in sensing, an image is focused on the image sensor core 19 such that different portion of the image impinges on each pixel element 10. As shown in FIG. 1B, each light detecting element 10 comprises a photodiode 20, or an equivalent photo sensing device, such as a photogate, bipolar phototransistor, etc., the conducting current of which is proportion to the intensity of the light impinging upon the junction of the photo sensing device.

At the beginning of the exposure cycle, an internal column line 24 is isolated because an access transistor T3 is turned off due to the inactive state of the RD signal. The photodiode 20 is initially reset to a value close to Vref level by means of the reset transistor T1, which is turned on by the active high state of the signal RST output from the row address shift register (not shown). All the operations of the conventional CMOS image core 19 can be illustrated with reference to U.S. patent application Ser. No. 09/103,959 filed on Jun. 24, 1998 by the same applicant, which is incorporated herein by reference.

The exposure commences as the reset transistor T1 is turned off by the inactive state of the signal RST. This allows the photodiode current, due to the light impinging on it, to discharge from the capacitance of the floating node Nd, reducing the charge on node Nd. The exposure time starts at the falling edge of the RST signal and stops at the rising edge of the sequential RST signal. After a sufficient time from the commencement of the exposure time, which may be varied to provide different image sensitivity or exposure control, the access transistors T3 in the row are turned on by an active RD signal for the row. This causes the photodiode voltage at node Nd, translated through the source follower transistor T2 and the access transistor T3, to be coupled to the internal column line 24. The voltage is offset by the source follower transistor T2, and, of course, will vary with the characteristics of the transistor T2. This voltage will be sampled and held in a following correlated-double sampling (CDS) circuit (not shown) at the end of the column line 24. At the end of the exposure interval, the reset transistors T1 in the row are then turned on again, causing the input of the source follower T2, which is coupled to the cathode node P of photodiode 20, to be reset to a value close to the Vref The actual signal sensed by the CDS circuit is the difference of signals at node C, denoted as $\Delta Vc$, before and after the reset a signal RST is activated. The subtraction of the signals of the node C at different moments is accomplished by the well known CDS circuitry, which will not be described in detail in this invention. With the above principle, as shown in FIG. 1B, the photodiodes 20 in each row are exposed to generate the current to the column lines in response to the reset signal for the row, i.e., RSTn, n=1 . . . 512 as well as the corresponding read signal RDn, and the reset signal for each row is activated sequentially in time to obtain the voltage differences for all the rows.

In the NTSC (National Television Standards Committee) television system, the television picture, as an example, adopted for a solid state sensor is composed of a plurality of image pixels arranged in 525 horizontal rows. The picture is divided into an odd field and an even field. Odd numbered lines 1, 3, 5, etc. of a television picture are scanned first and displayed in the odd field time. After the odd field has been scanned, even numbered lines 2, 4, 6, etc. of the television picture are scanned and displayed in the even field. The scanning scheme in which the odd field is interlaced with the even field is so-called interlace scanning.

For compatibility reasons, the NTSC scanning scheme has been carried over to the digital camera employing the CMOS image sensor. For a conventional NTSC interlace scanning scheme, the pixel array of 512 by 512 pixels for illustration of simplicity would be first scanned in an order of rows 1, 3, 5, 7, . . . and 511 for the odd field time by sequentially activating the reset signals RSTm, m=1, 3, 5, 7, . . . 511, then rows 2, 4, 6, 8, . . . , and 512 for the even field time by sequentially activating the reset signals RSTm, m=2, 4, 6, 8, . . . 512 under the control of the row address shift register, wherein each field takes roughly 1/60 second within the 1/30 second frame time. In this conventional method, as shown in FIG. 1B, there are 512 access transistors T3 as well as source follower amplifiers T2, and 512 floating sensing nodes Nd per row in the array. Each floating sensing node Nd is driven by one photodiode.

The analog signals produced by the light detecting elements 10 are apt to be contaminated by the above-mentioned types of noise, causing CMOS active pixel sensors to have lower sensitivity or lower dynamic range as compared to the CCD.

Therefore, improvement of sensitivity or dynamic range becomes a critical technical challenge for CMOS image sensor designers. The present invention intends to increase pixel sensitivity and to improve the overall image quality through a special pixel design arrangement.

SUMMARY OF INVENTION

An active pixel image sensor fabricated by a CMOS process is described herein which includes a two-dimensional pixel array core of photodiodes, the conductivity of which is related to the intensity of light impinging upon each of the photodiodes. The analog signal thus generated is buffered through a source follower amplifier, accessed by row transistors and coupled to respective columns in the array.

In one preferred embodiment of the present invention, by adding a transistor coupling each of two adjacent row pixel photodiodes in the column direction, only a half of source followers and access transistors, compared to the conventional CMOS image sensor, will then be needed, thus significantly halving the number of elements in the CMOS sensors.

Especially, by scanning the array with alternating row enable signals Eg1, Eg2, . . . ,Eg256 sequentially for the even field and Og1, Og2, . . . , Og256 sequentially for the odd field, the scanning scheme of the present invention is equivalent to that of the conventional interlaced scanning method in an order of rows (1, 2), (3, 4), (5, 6), . . . , (511, 512) for odd frame, then rows (2,3), (4,5), (6,7), . . . , (510,511), 512. Obviously, the approach of the invention provides better picture image quality than the known technique which uses repeated scanning of the same rows for both odd and even fields. In addition, with signals Egn & Ogn alternating sequentially between odd and even fields, each floating sensing node Nd corresponding to one pixel will be driven concurrently by two photodiodes corresponding with two adjacent pixels in the adjacent rows, which significantly enhances the sensitivity of the pixel by a factor of roughly two as compared with the conventional scheme shown in FIG. 1A. Moreover, according to one embodiment of the present invention, an amplifier transistor which couples the gate of the source follower T2 and the photodiode simultaneously acts as an amplifier which can increase the signal gain several times over. Thus, the sensitivity of a CMOS image sensor can be additionally enhanced significantly towards the goal of matching CCD performance.

Therefore, one object of the present invention is to increase the pixel sensitivity and to improve the overall image quality by a special pixel design arrangement.

Another object of the present invention is to significantly reduce the size and manufacture cost of the CMOS sensor by a special pixel design arrangement, while still maintaining or even enhancing the pixel sensitivity and image quality thereof.

BRIEF DESCRIPTION OF THE DRAWINGS

Other aspects and advantages of the invention will become apparent from the following descriptions taken in conjunction with the accompanying drawings, wherein.

DETAILED DESCRIPTION OF THE PREFERRED EMBODIMENT

Figure 1A:
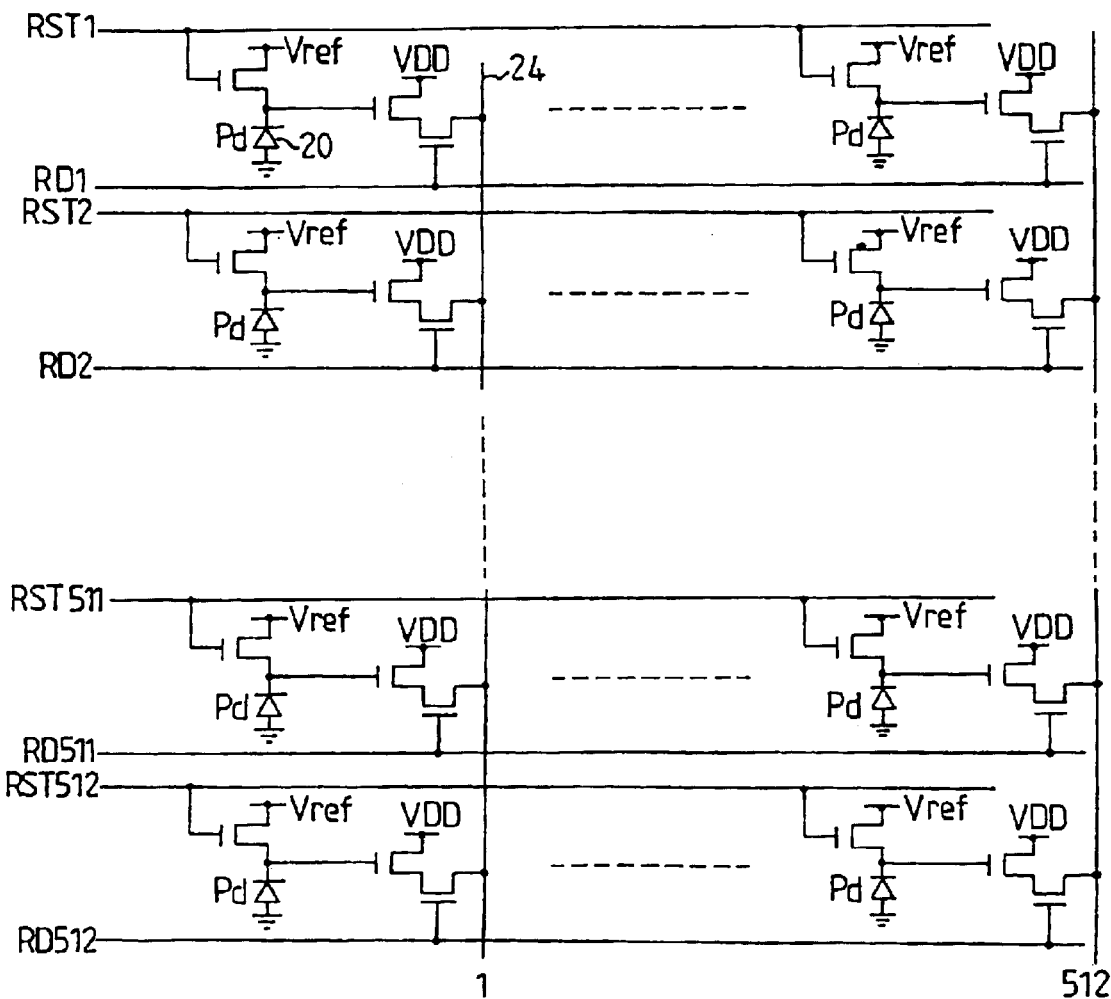
FIG. 1A shows a simplified schematic block diagram of a conventional CMOS image sensor consisting of 512 by 512 active pixels of FIG. 1A.
Figure 1B:
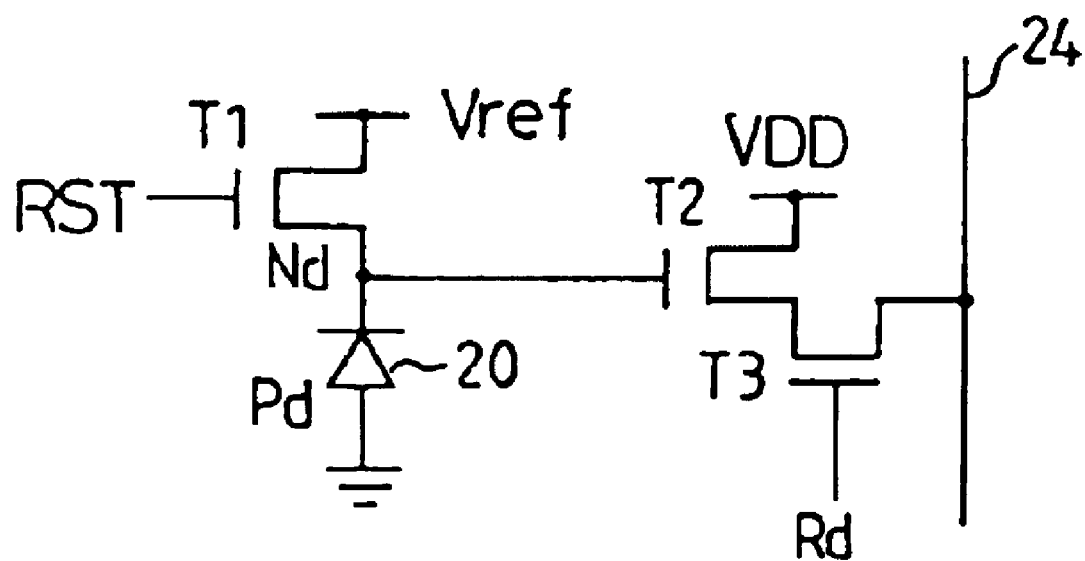
FIG. 1B shows a schematic diagram of the photocell structure of an active pixel employed in FIG. 1A.

The present application now will be described more fully (hereinafter parenthesized with reference to the accompanying drawings), in which embodiments of the invention are shown. Although one of the embodiments illustrated relates to a CMOS image sensor application, those skilled in the art will appreciate that this invention may be embodied in many different forms set forth herein; rather, these embodiments are provided so that this disclosure will be thorough and complete, and will fully convey the scope of the invention to those skilled in the art.

Reference now will be made in detail to the preferred embodiments of the present invention as illustrated in the accompanying drawings in which like reference numerals designate like or corresponding elements throughout the drawings.

Figure 2A:
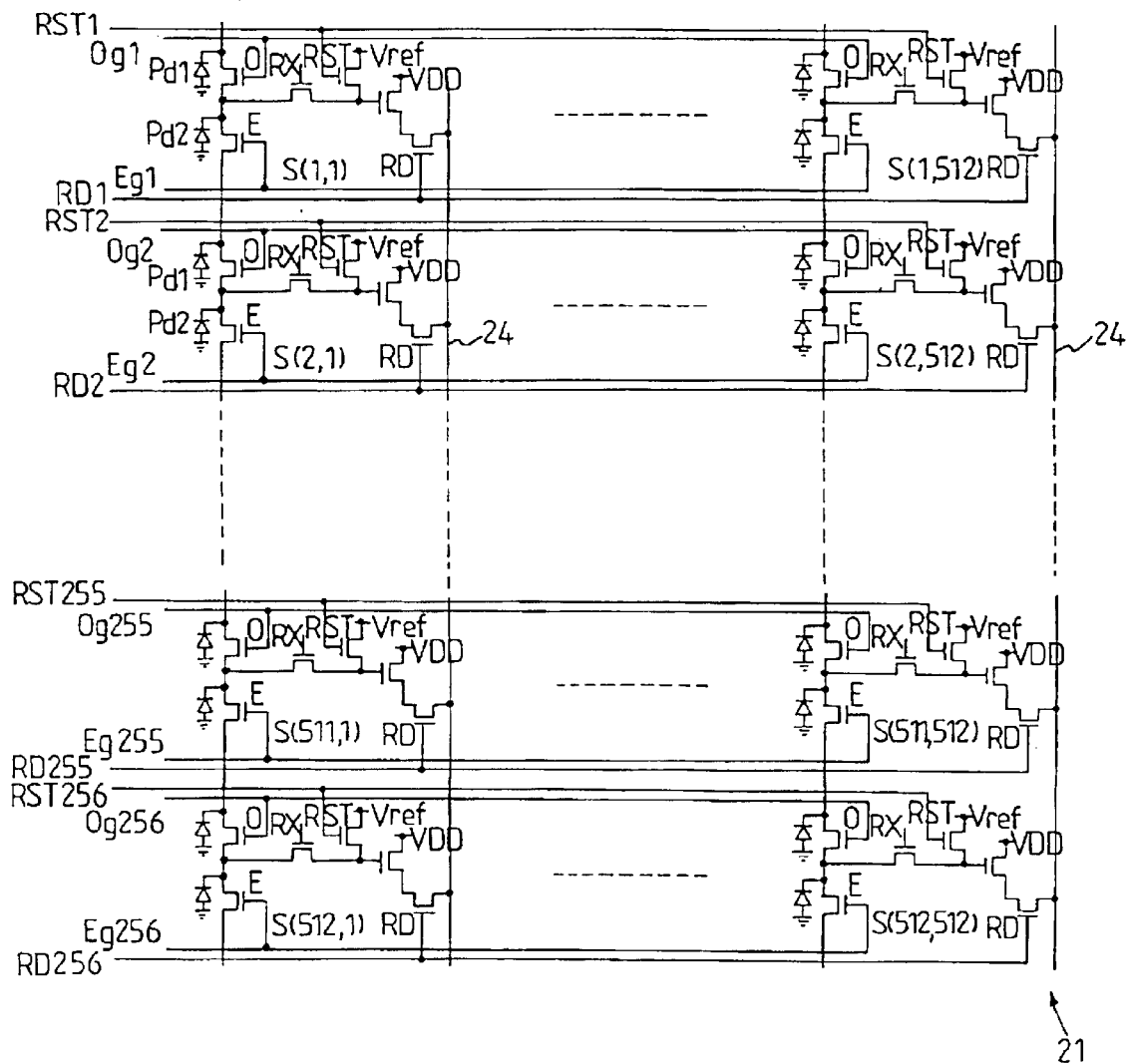
FIG. 2A shows a simplified schematic block diagram of a CMOS image sensor consisting of 512 by 512 active pixels according to one embodiment of the present invention.
Figure 2B:
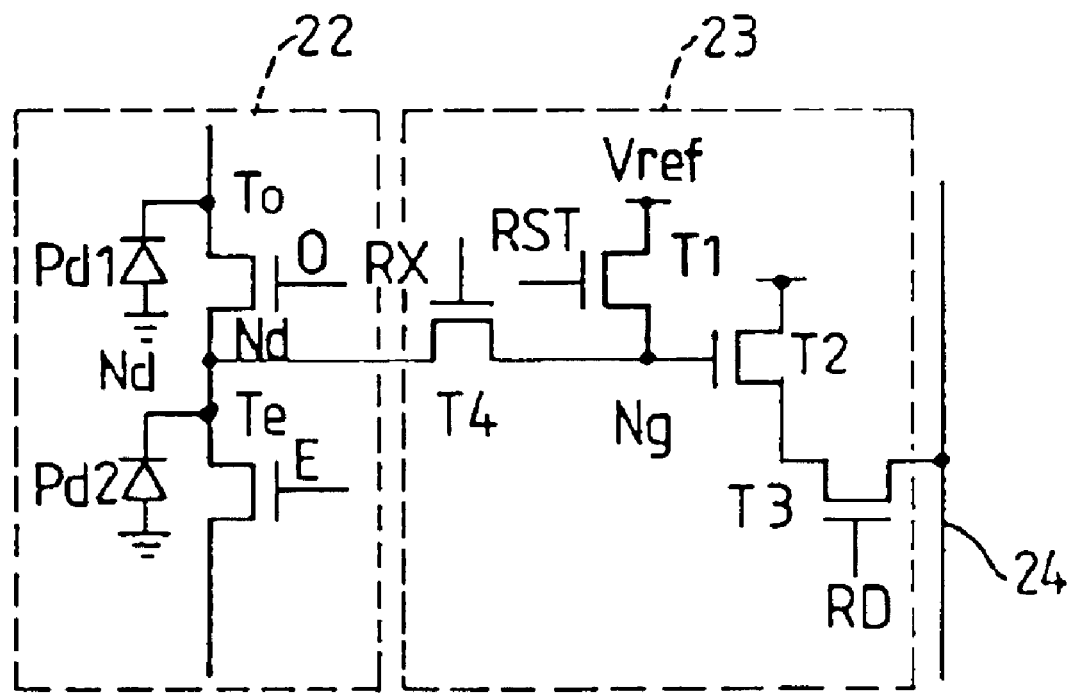
FIG. 2B shows a schematic diagram of the photocell structure of an active pixel employed in the CMOS image sensor of FIG. 2A.

FIG. 2A illustrates a CMOS image sensor array of 512 by 512 active pixels according to one preferred embodiment. Though the numbers of these pixels have been reduced for purposes of illustration, it should be understood that a more typical number of columns and rows will be adopted for the application of typical television systems. An image sensor core 21 comprises a two-dimensional pixel array of light detecting elements 22, each of which includes identical circuitry as shown in FIG. 2B.

According to one embodiment of the present invention, as shown in FIG. 2A, the CMOS image sensor core 21 has a geometric configuration of pixels comprising a plurality of pairs of light-detecting elements 22 arranged in rows and columns for generating respective analog signals in proportion to the intensity of the light impinging respective on one of the light-detecting elements 22. Each pair of light-detecting elements 22, for example, the first pair of light-detecting elements 22 in row 1 as shown in FIG. 2B, comprises a first photodiode Pd1 connected to a turn-on transistor To, and a second photodiode Pd2 connected to a turn-on transistor Te. The respective gates of the turn-on transistors Te and To, denoted as O and E, are connected to an odd gate control line Og1 and an even gate control line Eg1, respectively. The respective gates of the turn-on transistors Te and To in the pairs of light-detecting elements 22 in the same row are connected to a common odd gate control line Og1 and a common even gate control line Eg1, respectively.

Further, the first and second photodiodes Pd1, Pd2 in each pair of light-detecting elements 22 in the column direction are coupled in parallel at a floating sensing point Nd through the turn-on transistor To. Each pair of the light-detecting elements 22 further comprises translating means 23 coupled to said floating sensing point Nd for resetting the initial state of the floating sensing point Nd and reading out said analog signals to a column line 24. Slightly differing from the prior art, the translating means 23 further comprises an amplifier transistor T4. A signal RX connected to the gate of the amplifier transistor T4 is a DC bias voltage regardless of even or odd frame time. The voltage of the signal RX depending on the application or fabrication process is so configured that the transistor T4 acts as an amplifier for further amplifying the signal flowing between nodes Nd and Ng. The general operation of the translating means 23 has been detailed above.

In addition, said first and second phododiodes in adjacent pairs of light-detecting elements 22 in the adjacent rows, such as those denoted by S(1, 1) and S(2, 1), in the column direction are coupled in parallel through the turn-on transistor Te.

With the geometric pixel configuration of FIG. 2B, one single odd gate control line Ogn (n=1 . . . 256) will enable the odd turn-on transistors To in the same row, thereby rendering the photocurrents acquired in the first photodiode Pd1 and the second photodiode Pd2 of each pair of light-detecting elements 22 in that row exhibiting at the floating sensing point Nd. Similarly, one single even gate control line Egn (n=1.256) will enable the even turn-on transistors Te in the same row, thereby rendering the photocurrent acquired in the first photodiode Pd1 of each pair of light-detecting elements 22 in that row and the second photodiode Pd2 of each pair of light-detecting elements 22 in the adjacent row exhibiting at the floating sensing point Nd. In other words, each single gate control line can enable the generation of the photocurrents acquired in two rows of photodiodes and two adjacent gate control lines can, in effect, enable four rows of photodiodes with two rows of photodiodes repeated.

Figure 3:
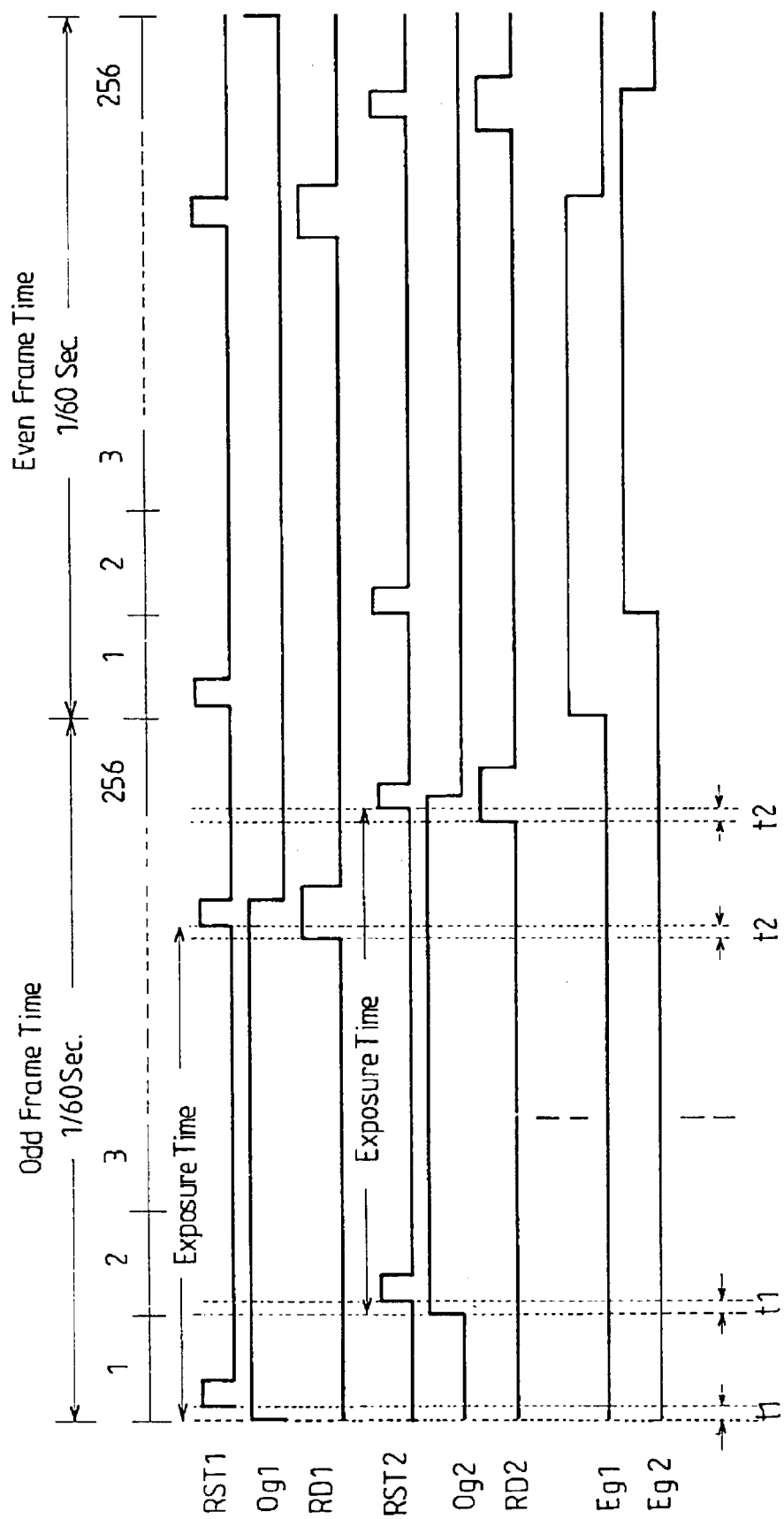
FIG. 3 illustrates a timing diagram of the signals employed in the CMOS image sensor of FIG. 2B.

For a CMOS image sensor adopted for an NTSC TV system, the pixel array is scanned 60 fields per second with odd and even fields alternatively, to achieve 30 frames per second operation. As shown in FIG. 3, during the odd field time, for the first row, the exposure time of the taken image starts right at the time when an active high signal RST1 briefly turns on the transistor T1 of the first row. The configuration that the transistor T1 is turned on by the active high signal RST1 renders the voltage level of the node Ng of the first row approximately equal to the reference voltage Vref, and also sets the voltage of the photodiode Pd1 or Pd2 to an initial reference level, wherein the voltage level of the node Ng of the first row is the gate voltage of the source follower transistor T2.

According to the present invention, for the first row, the first odd gate control signal Og1 is configured to enable right at the time leading the rising edge of the active high signal RST1 by about 1–2 μsec(s) (denoted by t1), and =then to be maintained at a logic high "1" level for at least the exposure time of the photodiode, which includes the pulse width of the RST1 signal, wherein the exposure time will not exceed one single field time. The configuration that the active high signal Og1 slightly leads the active high signal RST1 ensures that the turn-on transistor To has sufficient time to be turned on before the active high signal RST1. Similarly, for the second row, the signals RST2 and Og2 will be then turned on in the same way as RST1 and Og1, right at the time when one scan line time expires after the RST1 and Og1 are enabled. Similar operations are set forth for RST3, Og3, . . . , and RST256, Og256, sequentially in time. Also, for the first row, at the time leading the exposure time for RST1 by about 1–2 sec(s) (denoted by t2), a read signal RD1 will go to a logic high "1" to turn on the access transistor T3 to connect the source follower transistor T2 to the column line 24. Then, at 1–2 μsec(s) later, after the rising edge of the active high RD1 signal, RST1 will go to logic high "1" level again to turn on the reset transistor T1, thereby resetting the reference condition of Ng. The leading time t2 for RD1 ensures that the access transistor T3 has sufficient time to be turned on. The signal voltage difference at the column line 24 before and after the assertion of RST1 will represent the analog voltage signal of the pixel photodiode in row 1. After one scan line time, RD2 and RST2 will be enabled, and similarly for RD3, RST3, . . . ,RD256, RST256 sequentially in time. The timing operation for an even frame is similar to that for an odd frame as shown in FIG. 3.

In the timing operation described above, during the odd frame time, the turn-on transistor To in each pair of light detecting elements 22 in the odd rows is turned on sequentially from rows 1, 3, to 511. As mentioned above, the floating sensing node Nd in each pair of light detecting elements 22 in the odd rows is driven two pixel photodiodes in the two adjacent rows, thereby generating the current flow twice as many as that of the conventional scheme shown in FIG. 1A. Therefore, the overall sensing capability of the image sensor core 21 is significantly doubled as compared to the conventional type. The voltage differences at nodes Nd and Ng are more in detail with reference to U.S. patent application Ser. No. 09/103,959.

Figure 4A:
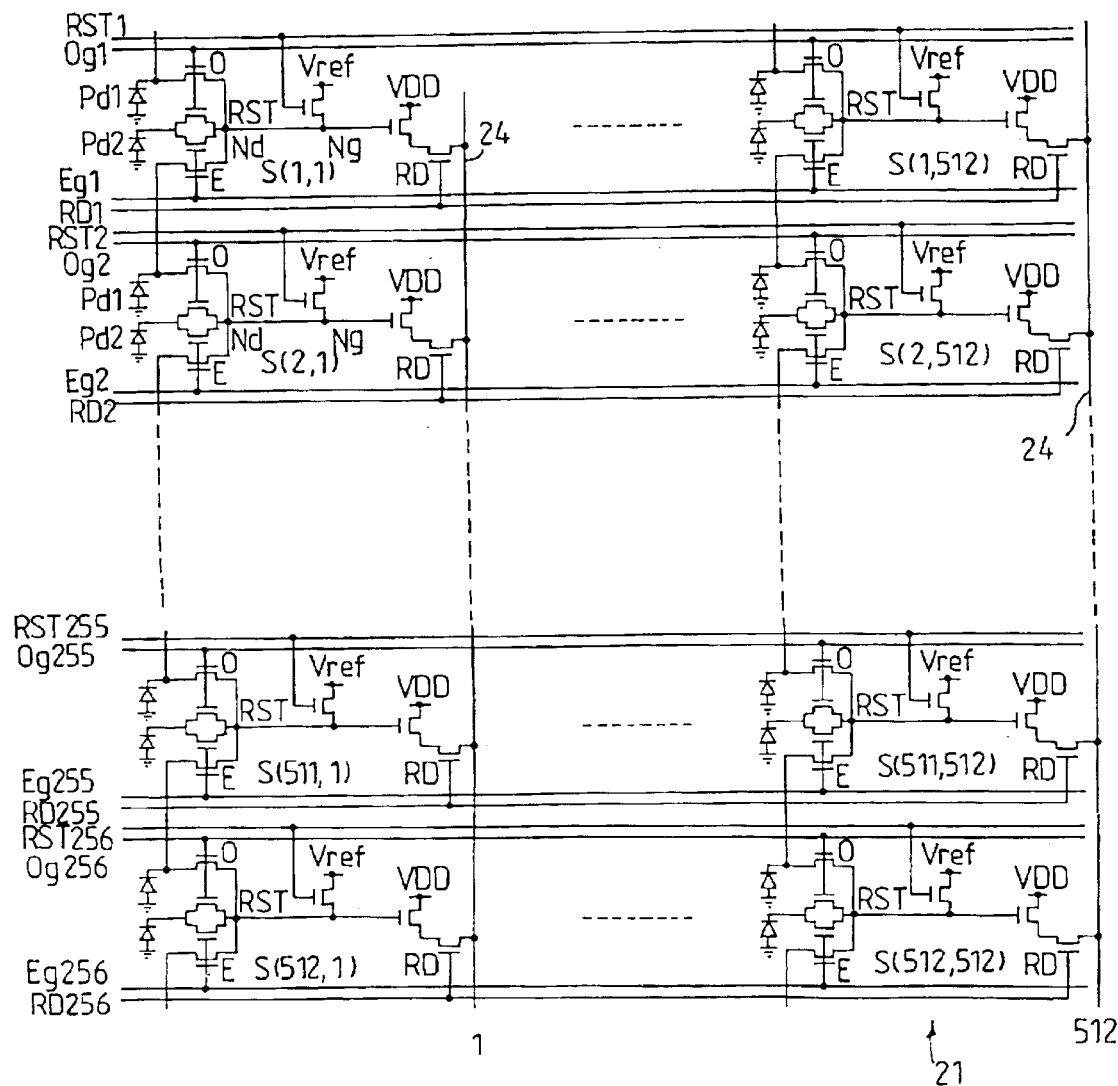
FIG. 4A shows a simplified schematic block diagram of a CMOS image sensor consisting of 512 by 512 active pixels according to another embodiment of the present invention.

According to another embodiment of the present invention, referring to FIG. 4A, which is slightly different from FIG. 2A in the light-detecting elements 22, each pair of light-detecting elements 22, for example, the first pair in row 2, comprises the first photodiode Pd1 connected to two turn-on transistors To and Te respectively located in the adjacent pair of the adjacent row, and the second photodiode Pd2 connected to two turn-on transistors To and Te configured in a back-to-back manner located in that pair. The respective gates of the turn-on transistors Te and To, denoted as O and E, are connected to different gate control lines Og1 and Eg1, respectively. As mentioned above, the respective gates of the turn-on transistors Te and To in each pairs of light-detecting elements 22 in the same row are connected to a common odd gate control line Og1 and common even gate control line Eg1, respectively.

The first and second photodiodes Pd1, Pd2 in each of the pairs of light-detecting elements 22 are coupled in parallel in the column direction at the floating sensing point Nd through two tun-on transistors To. The translating means 23 coupled to said floating sensing point Nd in this case operates in the same way as FIG. 2A.

In addition, said first and second phododiodes in adjacent pairs of light-detecting elements 22 in the adjacent rows are serially coupled in the column direction through two turn-on transistors Te.

Figure 4B:
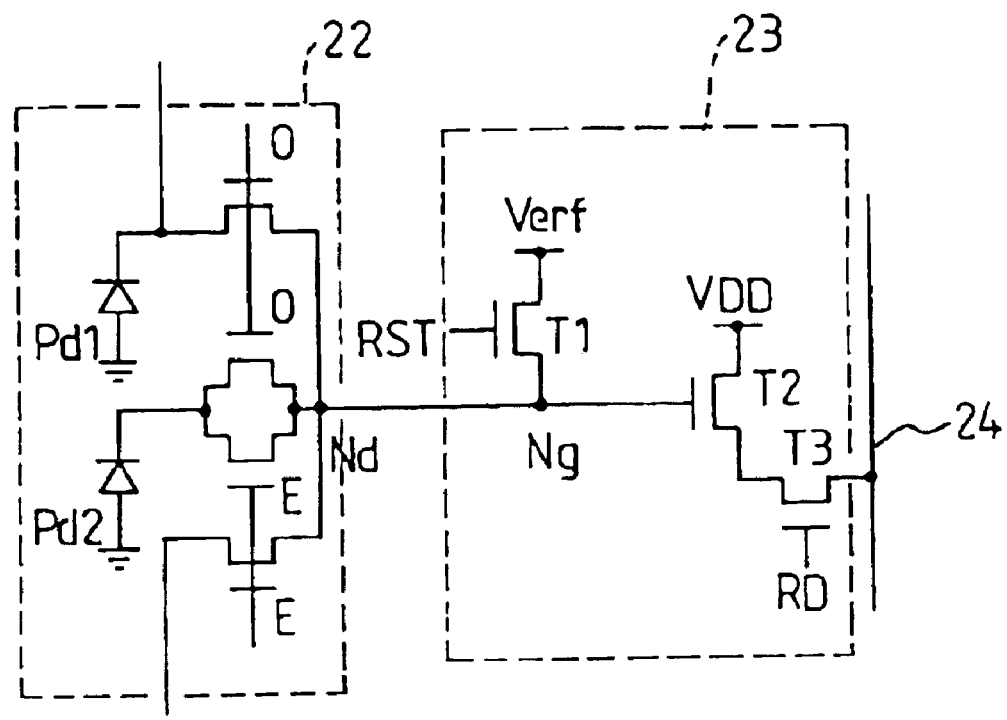
FIG. 4B shows a schematic diagram of the photocell structure of an active pixel employed in the CMOS image sensor of FIG. 4A.

With the geometric pixel configuration of FIG. 4B, one single odd gate control line Ogn (n=1.256) will enable the odd turn-on transistors To in the same row, thereby rendering the photocurrents acquired in the first photodiode Pd1 and the second photodiode Pd2 of each pair of light-detecting elements 22 in that row exhibiting at the floating sensing point Nd. Similarly, one single even gate control line Egn (n=10.256) will enable the even turn-on transistors Te in the same row, thereby rendering the photocurrent acquired in the first photodiode Pd1 of each pair of light-detecting elements 22 in that row and the second photodiode Pd2 of each pair 21) of light-detecting elements 22 in the adjacent row exhibiting at the floating sensing point Nd. In other words, each single gate control line can enable the generation of the photocurrents acquired in two rows of photodiodes and two adjacent gate control lines can in effect enable four rows of photodiodes with two rows of photodiodes repeated. Persons skilled in the art will appreciate that the principle of the present invention can be applied to some other types of structure in which each pair of light-detecting means 22 comprises three or more photodiodes connected in parallel in the column direction at the floating sensing point Nd and each single gate control line can enable the generation of the photocurrents acquired in three rows of photodiodes and two adjacent gate control lines can in effect enable six rows of photodiodes with four rows of photodiodes repeated.

According to one embodiment of the present invention, as shown in FIG. 2B, 256 scan lines (Og1, Eg1), (Og2, Eg2) . . . (Og256, Eg256) and reset signals (RST1, RST2, . . . , RST256) and read signals (RD1, RD2, . . . RD256) are connected to a row address shift register (not shown), the detail of which is well known in the art and will not be described herein. By scanning the array with sequential odd row scanning signals Og1, Og2, . . . Og256 for the odd field and with sequential even row scanning signals Eg1, Eg2, . . . and Eg256 for the even field, the resultant scanning effect is equivalent to that of the conventional interlaced scanning method in an order of rows (1, 2), (3, 4), (5, 6), . . . , (511; 512) for odd frame, then rows (2, 3), (4, 5), (6, 7), . . . , (510, 511). However, according to two embodiments of the present invention as shown in FIGS. 2–4, each single gate control line can enable the generation of the photocurrents acquired in two rows of photodiodes and two adjacent gate control lines can in effect enable four rows of photodiodes with two rows of photodiodes repeated. Within the odd field scan time or even filed scan time, the analog signals sequentially received from the column lines 24 are processed by the following circuits, such as CDS circuit, analog multiplier in combined with an NTSC encoder to generate corresponding analog signals.

Figure 5:
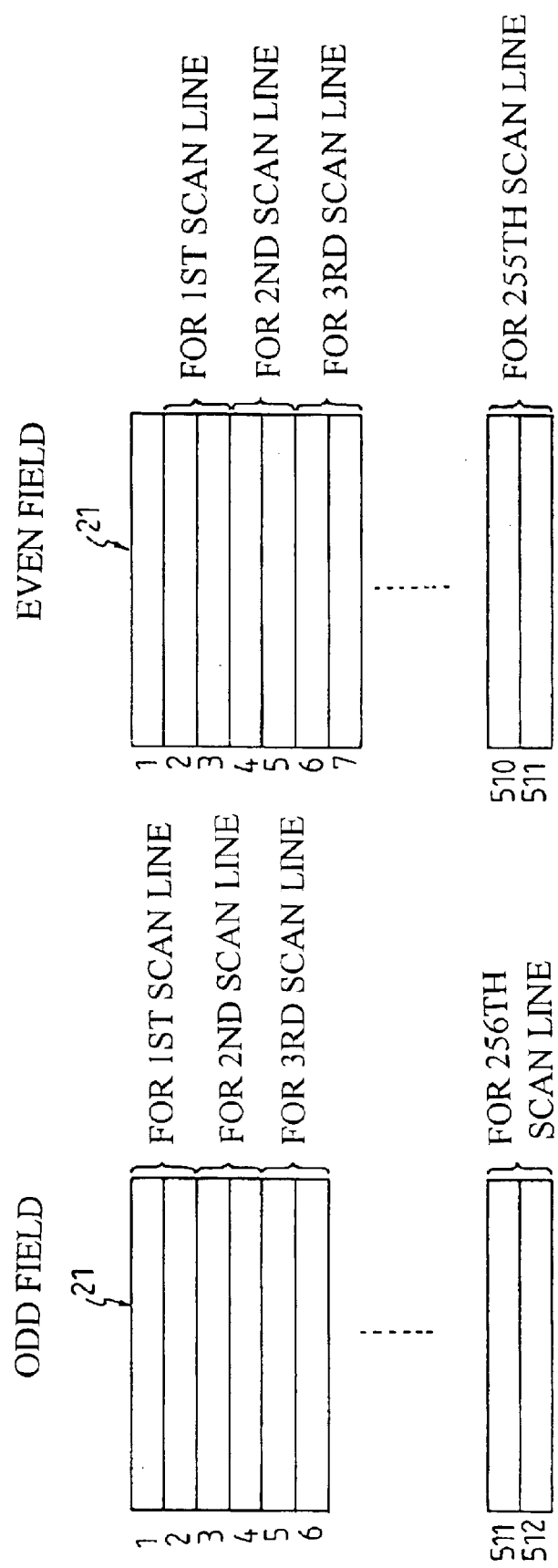
FIG. 5 shows the enabling scheme for rows of pixels during the odd field and even field according to the present invention.

As shown in FIG. 5, the digital signals enabled by the odd numbered gate control lines (i.e., the odd field) actually contains the odd image information from the odd numbered rows as well as the even numbered rows and similarly, the digital signals enabled by the even numbered gate control lines (i.e., the even field) actually contains the even image information from the even numbered rows as well as the odd numbered rows. In other words, the odd image information has correlation with the even image information. The components of the odd field and even field are correlated with one another and the time difference thereof is less than $\frac{1}{60}$ second. As proved in the art of color television, this approach of the invention provides better picture image quality than the known technique which uses repeated scanning of the same rows for both odd and even fields. In addition, with the gate control signals Egn & Ogn alternating sequentially between odd and even fields, each floating sensing node Nd corresponding to one pixel will be driven concurrently by two photodiodes corresponding with two adjacent pixels in the adjacent rows, which significantly enhances the sensitivity of the pixel by a factor of roughly two as compared with the conventional scheme shown in FIG. 1A.

As mentioned above, the amplifier transistor T4 is biased by the signal RX, causing the signal between nodes Nd and Ng to undergo amplification. According to the software simulation result, the overall sensitivity of the present invention can be increased as much as eight times greater than the conventional scheme. One additional advantage of the present invention is that odd and even fields are passed through the same amplifier transistor T4, source follower T2 and access transistor T3, which significantly mitigates pattern noise due to process variations in fabrication of these transistors. It is also notable that rather than 512 transistors, as in the case of conventional approach, according to the specific scheme of the present invention, only 256 reset transistors T5, source follower transistors T2, and access transistors T3 are needed, which significantly lower the manufacture costs and size of the image sensor core. As a result, the preferred embodiment method can improve the sensitivity of CMOS active pixel image sensor significantly, making its performance similar to that of a CCD.

Although the invention has been disclosed in terms of preferred embodiments, the disclosure is not intended to limit the invention. The invention still can be modified on varied by persons skilled in the art without departing from the scope and spirit of the invention which is determined by the claims below.

What is claimed is:

1. An image sensor for sensing the light of an image impinging thereupon and for translating the image into a standard television format, said image sensor comprising a plurality of pairs of light-detecting elements arranged in rows and columns, characterized in that each pair of light-detecting elements comprises:

(1) a first photo sensing means for generating analog signals in proportion to the intensity of the light impinging thereon;

(2) a second photo sensing means for generating analog signals in proportion to the intensity of the light impinging thereon;

(3) first turn-on means coupled to each of said first and second photo sensing means, wherein said first and second photo sensing means in each pair of light-detecting elements are coupled in parallel in the column direction at a floating sensing point through said first turn-on means, said first turn-on means being enabled by a first control line coupled thereto, such that analog signals acquired in said first and second photo sensing means of one of the same pairs are present at said floating sensing point in response to the enabling of said first control line; and (4) translating means coupled to said floating sensing point for resetting the initial state of said floating sensing point and reading out said analog signals to a column line;

wherein said first and second photo sensing means in adjacent pairs of light-detecting elements, respectively, are coupled in parallel in the column direction.

2. The image sensor of claim 1, wherein said translating means further comprises an amplifier transistor for amplifying the analog signals presenting at said floating sensing point.

3. The image sensor of claim 1, wherein said translating means comprises a reset transistor for resetting the initial state of said floating sensing point in response to a reset signal.

4. The image sensor of claim 1, wherein said first turn-on means comprises at least one turn-on transistor.

5. The image sensor of claim 1 further including second turn-on means coupled to said first and second photo sensing means in adjacent pairs of light-detecting elements, respectively, said second turn-on means being enabled by a second control line coupled thereto, such that analog signals acquired in said first and second photo sensing means of one of said adjacent pairs are present at said floating sensing point of one of said adjacent pairs in response to the enabling of said second control line.

6. The image sensor of claim 5, wherein said analog signals acquired in said photo sensing means controlled by said first control line constitutes first field signals and said analog signals acquired in said photodiodes controlled by said second control line constitutes second field signals, such that the components of said first field and second field signals are correlated with one another and the time difference thereof is less than 1/60 second, improving the quality of said image displayed in a television.

7. The image sensor of claim 5, wherein said second turn-on means comprises at least one turn-on transistor.

8. A method for generating analog image signals from an image sensor, the method comprising the steps of:
 (1) providing an image sensor comprising a plurality of pairs of light-detecting elements arranged in rows and columns, each pair of light-detecting elements comprising a first photo sensing means, a second photo sensing means, at least one turn-on means coupled to each of said first and second photo sensing means, and translating means;
 (2) generating respective analog signals in proportion to the intensity of the light impinging on respective one of the light-detecting elements;
 (3) coupling said first and second photo sensing means in each pair of light-detecting elements in parallel in the column direction at a floating sensing point, through a first turn-on means enabled by a first control line;
 (4) coupling said first and second photo sensing means in adjacent pairs of light-detecting elements in parallel in the column direction at said floating sensing point, through a second turn-on means enabled by a second control line;
 (5) alternately enabling said first and second control lines; and
 (6) obtaining said analog signals acquired in said first and second photodiodes of one of the same pairs or the adjacent pairs presented at said floating sensing point, in response to the enabling of one of said first or second control lines, respectively.

9. The method of claim 8, after the providing step and before the generating step, further comprising the step of resetting the initial state of said floating sensing point via said translating means in response to a first reset signal received by said translating means.

10. The method of claim 9, further comprising the step of (g) reading out said analog signals in response to a read out signal received by said translating means.

11. The method of claim 10, further comprising the step of (h) resetting the initial state of said floating sensing point in response to a second reset signal received by said translating means.

12. The method of claim 11, wherein the exposure time of each of the first and second photo sensing means is defined by the duration between said first reset signal and said second reset signal, and each of said first and second control lines is maintained at a logic high level for at least the exposure time.

13. The method of claim 12, wherein each of said first and second control lines is enabled by a control signal leading said first reset signal by a first predetermined time to ensure that said first or second turn-on means is enabled before said first reset signal, and said read out signal leads said second reset signal by a second predetermined time to ensure that an access transistor of said translating means is activated before said second reset signal.

* * * * *